(12) United States Patent
Short et al.

(10) Patent No.: US 11,156,141 B2
(45) Date of Patent: Oct. 26, 2021

(54) FLUID INJECTORS FOR HOT FLOW

(71) Applicant: Delavan Inc., West Des Moines, IA (US)

(72) Inventors: John Earl Short, Norwalk, IA (US); Randall J. Quandt, Summerville, SC (US)

(73) Assignee: Delavan Inc., West Des Moines, IA (US)

( * ) Notice: Subject to any disclaimer, the term of this patent is extended or adjusted under 35 U.S.C. 154(b) by 37 days.

(21) Appl. No.: 16/450,617

(22) Filed: Jun. 24, 2019

(65) Prior Publication Data
US 2020/0400056 A1 Dec. 24, 2020

(51) Int. Cl.
*F01N 3/20* (2006.01)
*F01N 3/035* (2006.01)
*F01N 3/08* (2006.01)

(52) U.S. Cl.
CPC .......... *F01N 3/2046* (2013.01); *F01N 3/035* (2013.01); *F01N 3/0821* (2013.01); *F01N 2310/00* (2013.01)

(58) Field of Classification Search
CPC ...... F01N 3/2046; F01N 3/035; F01N 3/0821; F01N 2310/00
See application file for complete search history.

(56) References Cited

U.S. PATENT DOCUMENTS

| | | | |
|---|---|---|---|
| 9,617,889 B2 | 4/2017 | Trivedi et al. | |
| 2002/0162322 A1* | 11/2002 | Ganzmann | F01N 3/2066 60/286 |
| 2004/0025498 A1* | 2/2004 | Lambert | F02M 53/00 60/286 |
| 2009/0092525 A1* | 4/2009 | Ichikawa | B01D 53/9431 422/177 |
| 2011/0239631 A1* | 10/2011 | Bui | B01F 5/061 60/295 |
| 2014/0363357 A1* | 12/2014 | Trivedi | F01N 3/2066 423/212 |
| 2014/0369898 A1* | 12/2014 | Miller | B01F 5/0463 422/168 |
| 2014/0369899 A1 | 12/2014 | Fahrenkrug et al. | |

FOREIGN PATENT DOCUMENTS

| | | | |
|---|---|---|---|
| DE | 102004050022 A1 | 4/2006 | |
| DE | 102008001092 A1 * | 11/2008 | ........... F01N 3/2066 |
| DE | 102008001092 A1 | 11/2008 | |
| DE | 102010030343 A1 | 12/2011 | |
| GB | 2548129 A | 9/2017 | |

OTHER PUBLICATIONS

Machine Translation of DE 102008001092 A1 (Nishijima) (Year: 2008).*
Extended European search report issued in corresponding EP application No. 19212088.9, dated Mar. 10, 2020.

* cited by examiner

*Primary Examiner* — Brandon D Lee
(74) *Attorney, Agent, or Firm* — Locke Lord LLP; Daniel J. Fiorello; Gabrielle L. Gelozin

(57) ABSTRACT

A fluid injector for injecting an injection fluid into a hot flow can include a flow structure defining an injection flow channel and configured to extend at least partially into a flow path to introduce the injection fluid into the hot flow in the flow path. The flow structure can include one or more heat resistance features to protect the flow structure and the fluid from heat of the hot flow.

17 Claims, 8 Drawing Sheets

FLUID INJECTORS FOR HOT FLOW

FIELD

This disclosure relates to fluid injectors for use in a hot flow applications, e.g., for injecting diesel exhaust fluid (DEF) in an exhaust stream.

BACKGROUND

There is a need to reduce pollutants of diesel engines. Emission requirements are increasingly stringent and difficult to meet with existing technology. Most new diesel vehicles are equipped with a Selective Catalytic Reduction system (SCR) which reduces emissions by injecting Diesel Exhaust Fluid (DEF) into the exhaust stream. DEF is a urea solution which, aided by a catalyst, causes NOx to convert to nitrogen and water.

A primary limitation of SCR systems is the effectiveness of the DEF injector. Existing injector structures are relegated to the side wall to avoid directly interacting with the hot exhaust flow, e.g., to avoid heat damage.

Such conventional methods and systems have generally been considered satisfactory for their intended purpose. However, there is still a need in the art for improved injectors for hot flow. The present disclosure provides a solution for this need.

SUMMARY

A fluid injector for injecting an injection fluid into a hot flow can include a flow structure defining an injection flow channel and configured to extend at least partially into a flow path (e.g., radially inward from a wall defining a flow path) to introduce the injection fluid into the hot flow in the flow path. The flow structure can include one or more heat resistance features to protect the flow structure and the fluid from heat of the hot flow.

The fluid injector can be configured to spray a selective catalytic reduction (SCR) fluid for at least partially causing a catalytic reaction within the hot flow. For example, the flow path can be a diesel exhaust channel, the hot flow can be diesel exhaust, and the SCR fluid can be a diesel exhaust fluid (DEF) such that the injector is a diesel exhaust fluid (DEF) injector configured to spray DEF into the diesel exhaust.

The flow structure can include a base, a stem extending from the base, and an injector head at a distal end of the stem. The stem can be configured to extend the injector head into a center of the flow path.

In certain embodiments, the one or more heat resistance features can include active cooling. For example, the structure can define a cooling channel enclosed therein and configured to circulate a cooling fluid from an inlet on the base, through the stem, to the injector head, and back through the stem to an outlet on the base. The cooling channel can include at least one tortuous path (e.g., a circuitous and/or labyrinth path) in the injector head to wind at least partially around the injector head in at least one direction. In certain embodiments, the cooling fluid can be diesel fuel.

In certain embodiments, the active cooling can include a DEF recirculation path connected to the injection flow channel and configured to allow recirculation of the DEF to provide active cooling with recirculation of DEF. Any other suitable active cooling scheme is contemplated herein.

In certain embodiments, the one or more heat resistance features include an insulating structure. The insulating structure can define a heat shield gap within at least a portion of the stem and the injector head.

The fluid injector can include one or more swirler outlets disposed in the injector head and in fluid communication with the injection flow channel to swirl and spray the injection fluid into the flow path. The one or more swirler outlets can include a plurality of swirler outlets pointed in different directions.

A selective catalytic reduction (SCR) system can include a diesel exhaust fluid (DEF) injector configured to receive diesel fuel to cool the diesel exhaust fluid injector. The system can include a catalyst disposed within the exhaust flow path downstream of the DEF injector and configured to receive DEF sprayed from the DEF injector to catalyze exhaust gas.

A method can include injecting diesel exhaust fluid (DEF) into a diesel exhaust from a center of a diesel exhaust channel using an injector. The method can include actively cooling the DEF in the injector. Actively cooling the DEF in the injector can include circulating diesel fuel through the injector. Actively cooling the DEF can include circulating DEF through the injector. Any other suitable methods and/or portions thereof are contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
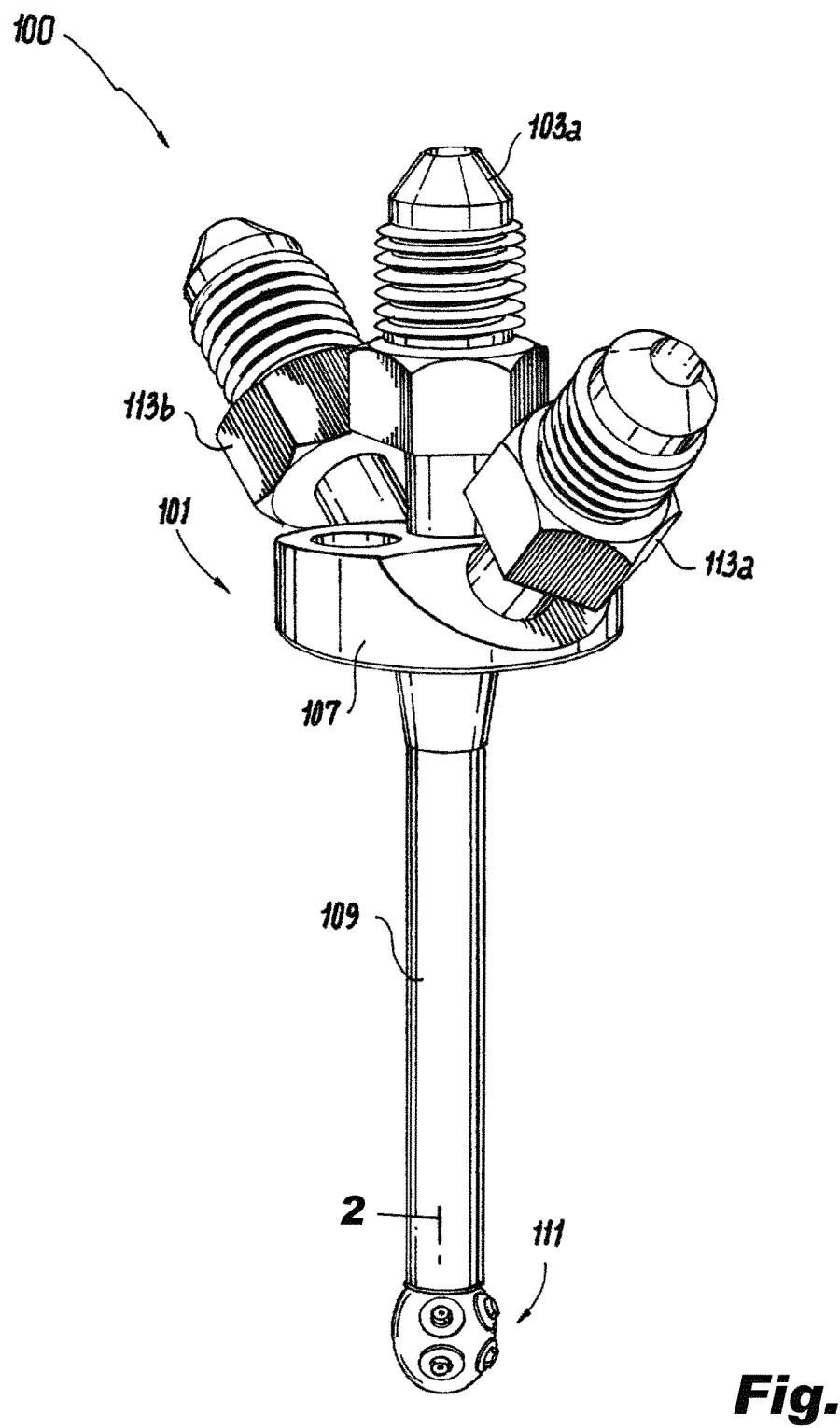
FIG. 1 is a perspective view of an embodiment of a fluid injector in accordance with this disclosure, shown having inlets and outlets for active cooling as well as injecting fluid.

Reference will now be made to the drawings wherein like reference numerals identify similar structural features or aspects of the subject disclosure. For purposes of explanation and illustration, and not limitation, an illustrative view of an embodiment of a fluid injector (e.g., a diesel exhaust fluid injector) in accordance with the disclosure is shown in FIG. 1 and is designated generally by reference character 100. Other embodiments and/or aspects of this disclosure are shown in FIGS. 2-9. Certain embodiments described herein can be used to improve and control fluid injection into a hot flow (e.g., exhaust).

Referring to FIGS. 1-4, a fluid injector 100 for injecting an injection fluid into a hot flow can include a flow structure 101 defining an injection flow channel 103 and configured to extend at least partially into a flow path (e.g., radially inward from a wall defining a flow path) to introduce the injection fluid into the hot flow in the flow path. The flow structure 101 can include one or more heat resistance features to protect the flow structure 101 and the injection fluid from heat of the hot flow.

Figure 5:
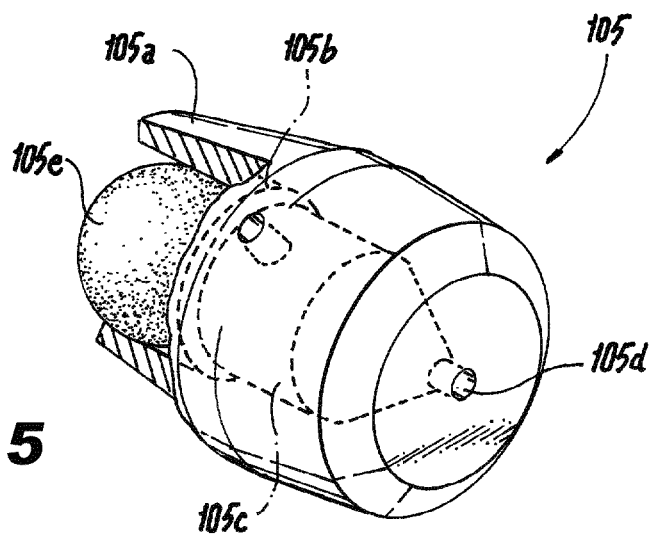
FIG. 5 is a perspective view of an embodiment of a swirler outlet in accordance with this disclosure.
Figure 6:
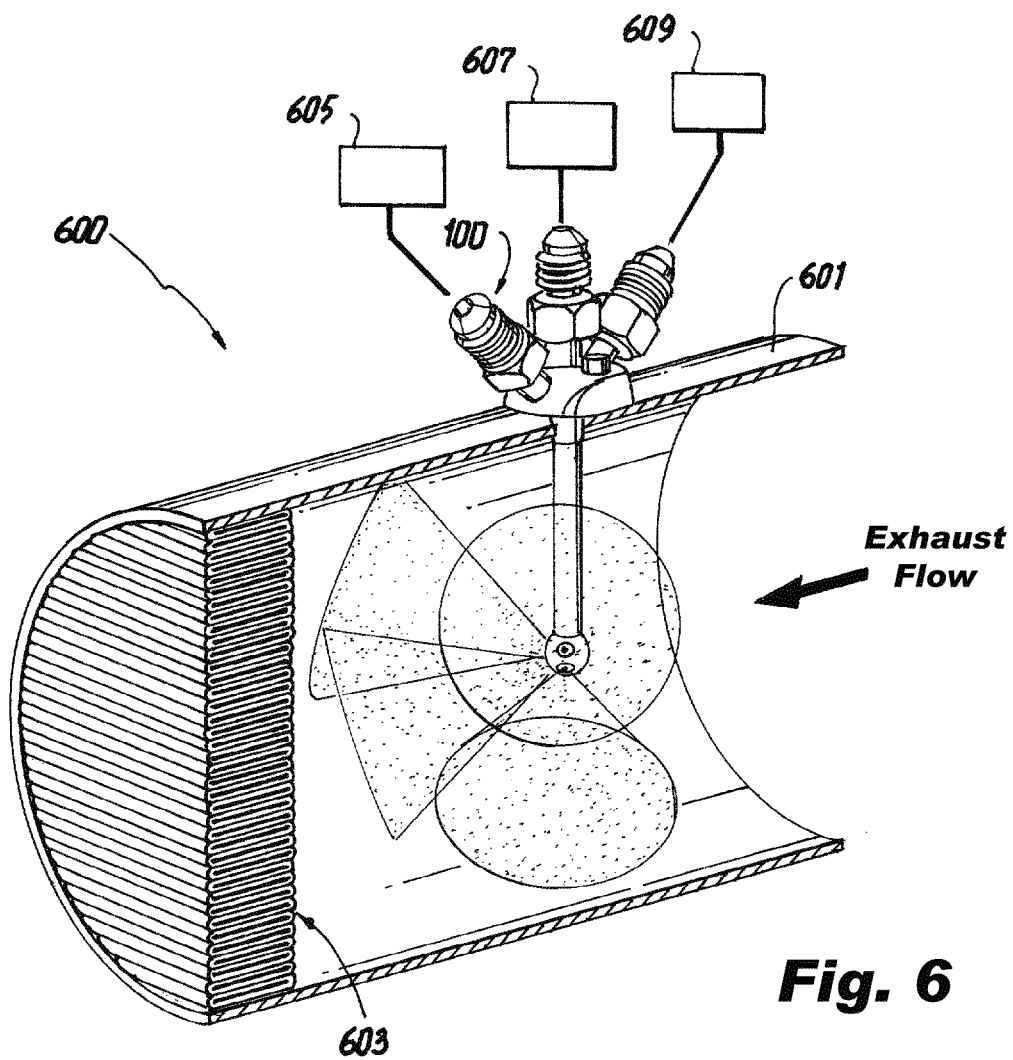
FIG. 6 is a perspective view of an embodiment of an SCR system in accordance with this disclosure, showing the exhaust channel sectioned.

Referring additionally to FIGS. 5 and 6, for example, the fluid injector 100 can be configured to spray (e.g., via a swirler outlet 105 or any other suitable outlet) a selective catalytic reduction (SCR) fluid for at least partially causing a catalytic reaction within the hot flow (e.g., in conjunction with a catalyst screen 603 as appreciated by those having ordinary skill in the art). For example, the flow path can be a diesel exhaust channel 601 (e.g., as shown in FIG. 6), the hot flow can be diesel exhaust, and the SCR fluid can be a diesel exhaust fluid (DEF) such that the injector 100 is a diesel exhaust fluid (DEF) injector configured to spray DEF into the diesel exhaust to react with the exhaust gas and the catalyst filter 603 to convert exhaust to nitrogen and water. The DEF can be a urea-water solution and/or any other solution as appreciated by those having ordinary skill in the art.

The flow structure 101 can include a base 107, a stem 109 extending from the base 107, and an injector head 111 at a distal end of the stem 109. The stem 109 can be configured to extend the injector head 111 into a center of the flow path, e.g., into the center of diesel exhaust channel 601 as shown in FIG. 6. The injection fluid channel 103 can be in fluid communication with an inlet 103a to receive the injection fluid.

In certain embodiments, the one or more heat resistance features can include active cooling. For example, the structure 101 can define a cooling channel 113 enclosed therein and configured to circulate a cooling fluid from an inlet 113a on the base 107, through the stem 109, to the injector head 111, and back through the stem 109 to an outlet 113b on the base 107 (e.g., as partially shown in FIG. 3). The cooling channel 113 can at least partially surround and/or circumferentially wrap around the injector fluid channel 103 along a longitudinal (e.g., axial or radial) length of the stem 109.

Figure 4:
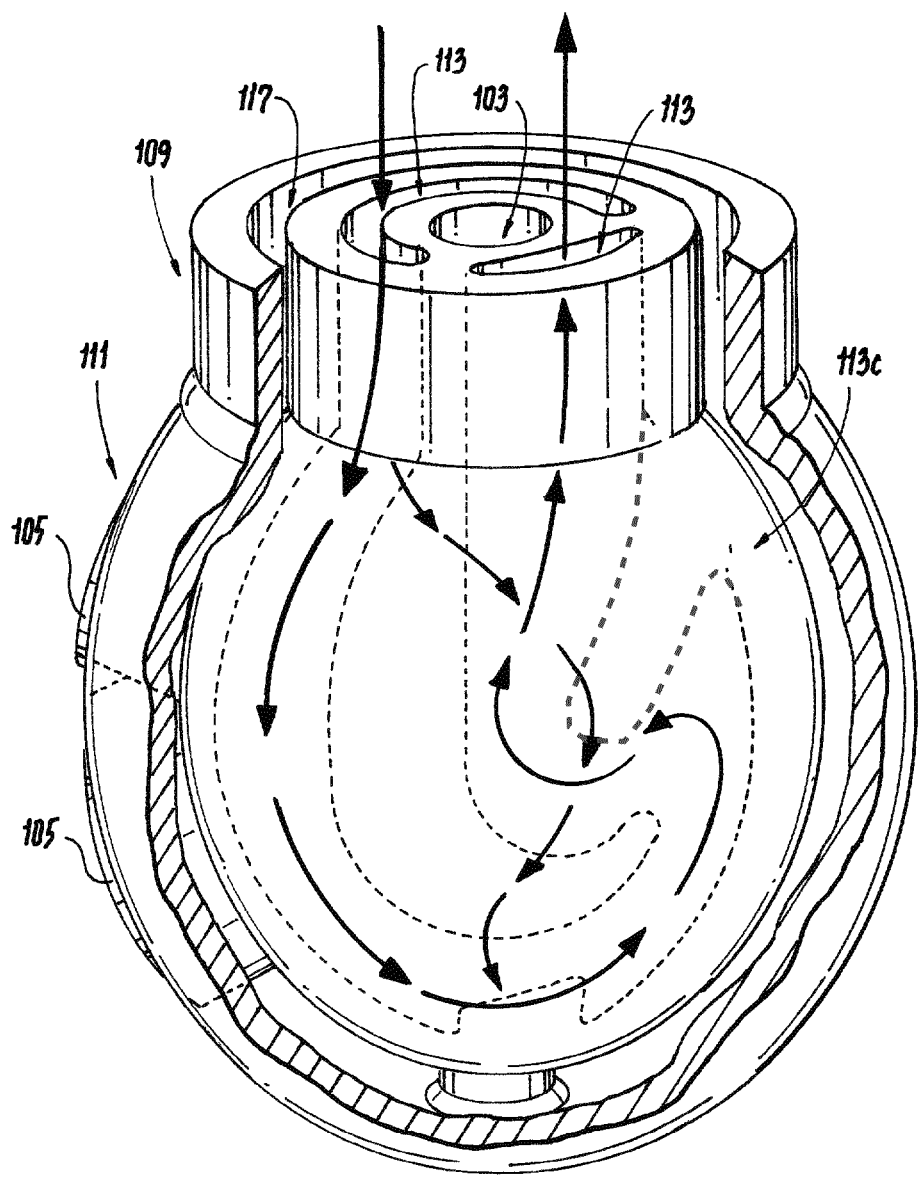
FIG. 4 is perspective partial phantom view of the portion shown in FIG. 2, illustrating a tortuous path for coolant through the injector head as well as a heat shield gap.

As best depicted in FIG. 4, the cooling channel 113 can include at least one tortuous path 113c (e.g., a circuitous and/or labyrinth path) in the injector head 111 to wind at least partially around and injector head 111 in at least one direction (e.g., in multiple directions). For example, the at least one tortuous path 113c can include one or more pathways that wrap at least partially around in a circumferential and axial direction. In certain embodiments, the at least one tortuous path 113c can include a serpentine shape inside the injector head 111, e.g., as shown in FIG. 4. The at least one tortuous path 113 can at least partially wind around an area of the one or more outlets. Any other suitable cooling fluid channel shape is contemplated herein.

In certain embodiments, the cooling fluid can be diesel fuel. The diesel fuel can be pumped using existing fuel pumps, for example, and can be recirculated to the tank or sent to the engine after receiving heat in the cooling channel. Any suitable cooling fluid and/or fluid pathway is contemplated herein.

Figure 7:
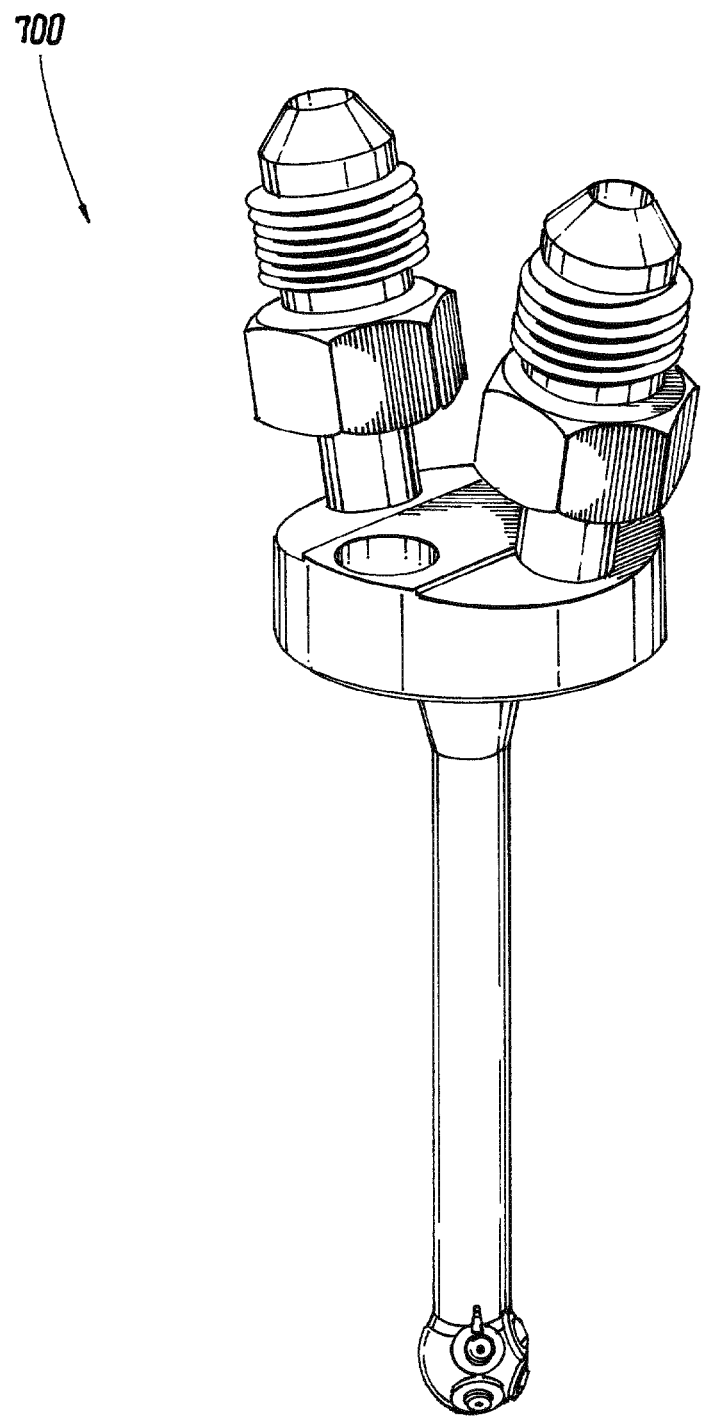
FIG. 7 is a perspective view of another embodiment of a fluid injector in accordance with this disclosure.
Figure 8:
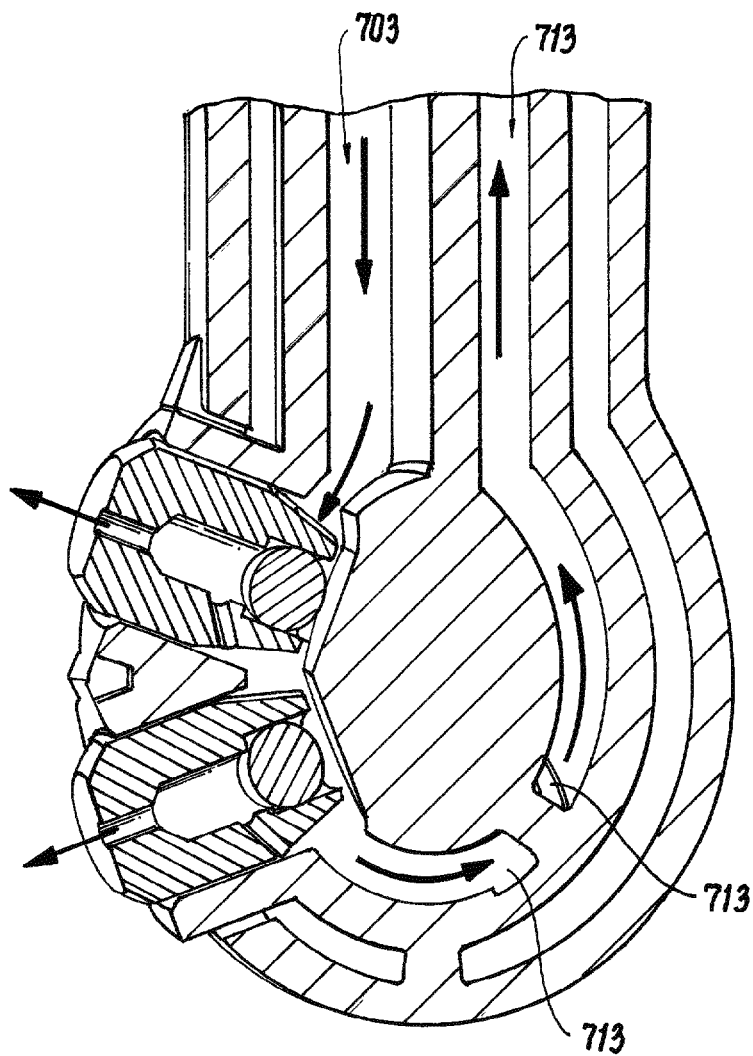
FIG. 8 is a partial cross-sectional view of the embodiment of FIG. 7, showing injector fluid recirculation through the injector head, e.g., via a tortuous path.

Referring additionally to FIGS. 7 and 8, in certain embodiments, the active cooling can utilize injector fluid recirculation. For example, an injector 700 can include a DEF recirculation path 713 connected to the injection flow channel 703 and configured to allow recirculation of the injection fluid (e.g., DEF) to provide active cooling with recirculation of the injection fluid (e.g., DEF). The injection fluid can be recirculated to the fluid tank (e.g., DEF) or to any other suitable location (e.g., a heat exchanger for maintaining suitable DEF temperature in the tank). Flow volume is higher than the required spray volume. Any suitable components for recirculation can are contemplated herein (e.g., a dedicated pump). The outlets may be configured to allow recirculation instead of effusing all flow that is pumped to the outlets. Any other suitable active cooling scheme is contemplated herein.

In certain embodiments, the one or more heat resistance features can include an insulating structure 115. The insulating structure 115 can define a heat shield gap 117 within at least a portion of the stem 109 and the injector head 111, e.g., as shown in FIGS. 2, 3, 4, and 8. The heat shield gap 117 can be an air pocket, a vacuum, or include any other suitable gas. The insulating structure 115 and the heat shield gap 117 can be outboard of the cooling fluid channel 113 and/or any structure that defines the cooling fluid channel 113, for example.

Figure 2:
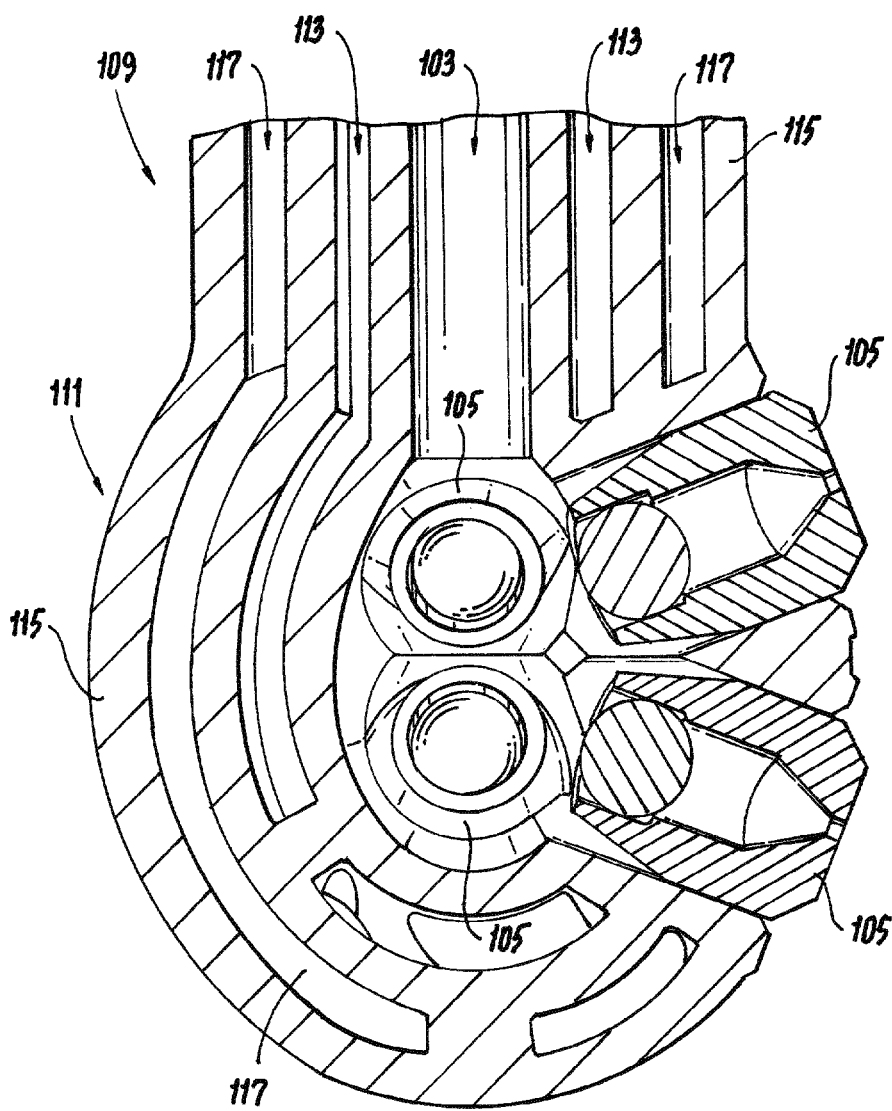
FIG. 2 is a partial cross-sectional view of the embodiment of FIG. 1, showing a portion of the stem and injector head.
Figure 3:
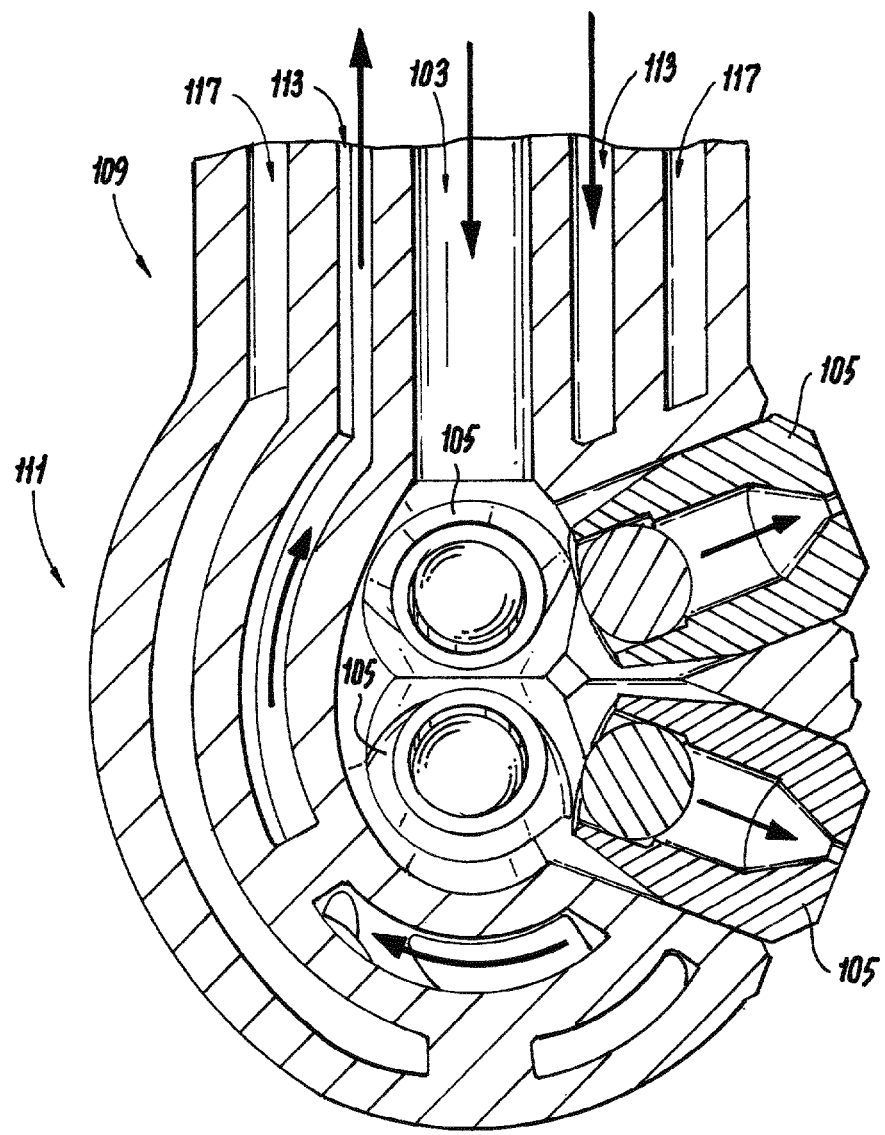
FIG. 3 is the partial cross-sectional view of FIG. 2, showing injector fluid flow and cooling fluid flow through the head.

Referring to FIGS. 2, 3, and 5, the fluid injector 100 can include one or more swirler outlets 105 disposed in the injector head 111 and in fluid communication with the injection flow channel 103 to swirl and spray the injection fluid into the flow path. The one or more swirler outlets 105 can include a plurality of swirler outlets 105 (e.g., four as shown) pointed in different directions (e.g., to create a wider spray area). Any suitable number of swirler outlets 105 can be included, e.g., one to four.

The one or more swirler outlets 105 can include any suitable structure to swirl and spray flow. For example, the one or more swirler outlets can include a tapered upstream portion 105a having one or more angled swirl holes 105b connected to a swirl chamber 105c which converges to a smaller outlet 105d. The swirl chamber 105c can be plugged by a plug ball 105e. In certain embodiments, the swirl chamber can be enclosed by the body of the swirler outlet 105 (e.g., being made by additive manufacturing or any other suitable method). Any other suitable swirler outlet 105 and/or other type of outlet is contemplated herein.

As shown in FIG. 6, a selective catalytic reaction (SCR) system 600 can include a diesel exhaust fuel (DEF) injector (e.g., fluid injector 100 as shown) configured to receive diesel fuel (e.g., from a tank 605) to cool the diesel exhaust fluid injector, e.g., 100. After cooling, the diesel fuel can be sent to the fuel injectors 609 for the diesel engine, carrying the reclaimed exhaust heat, which may improve combustion efficiency. Recirculation into the tank 605 is contemplated herein, however.

The system 600 can include a catalyst 603 disposed within the exhaust flow path downstream of the DEF injector, e.g., 100 and configured to receive DEF (e.g., from a DEF tank 607) sprayed from the DEF injector, e.g., 100 to catalyze exhaust gas. As shown, the injector, e.g., 100 can extend far into the flow (e.g., to the centerline as shown) to improve DEF distribution and ultimately catalyst efficiency, for example. The DEF injector can be any injector disclosed herein, e.g., as described above.

A method can include injecting diesel exhaust fluid (DEF) into a diesel exhaust from a center of a diesel exhaust channel using an injector. The method can include actively cooling the DEF in the injector. Actively cooling the DEF in the injector can include circulating diesel fuel through the injector. Actively cooling the DEF can include circulating DEF through the injector. Any other suitable methods and/or portions thereof are contemplated herein.

Figure 9:
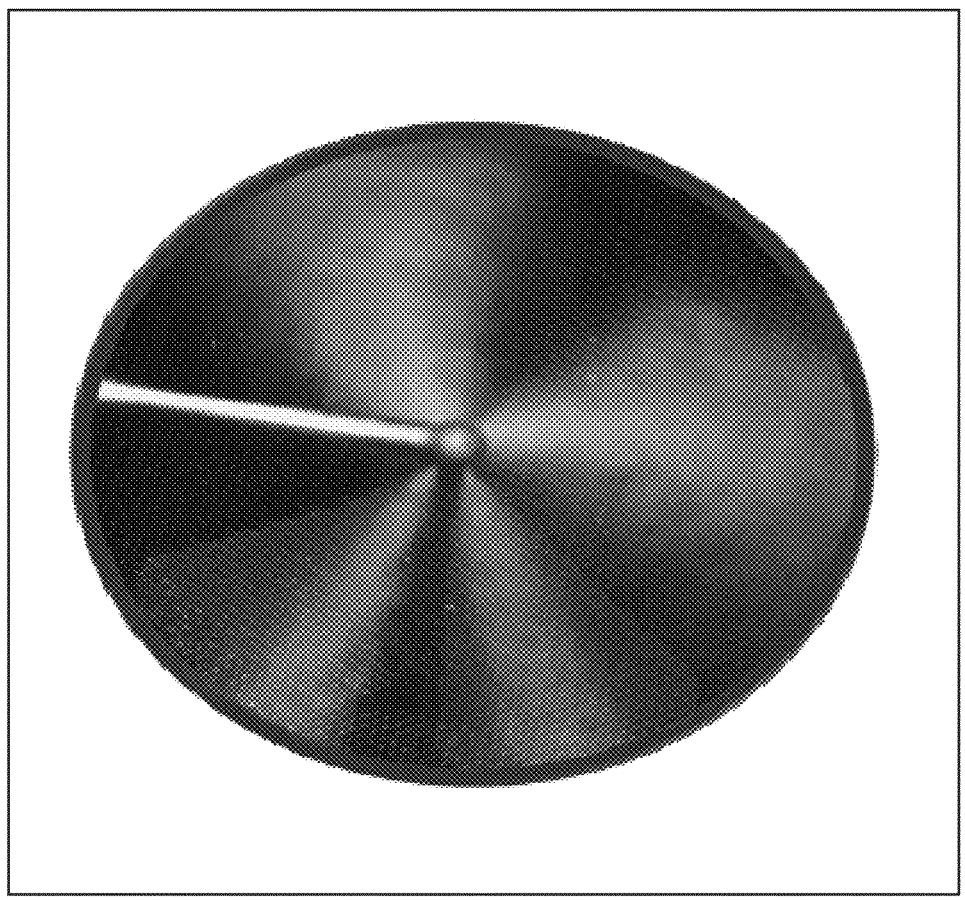
FIG. 9 shows a plan view (e.g., downstream direction of hot flow) of the injector head of the fluid injector of FIG. 1, showing a spray pattern.

FIG. 9 shows a plan view (e.g., downstream direction of hot flow) of the injector head 100 spraying. An embodiment of a spray pattern in the downstream direction is shown, based on the outlet position of the embodiment of FIG. 1. FIG. 9 shows symmetry of actual spray (it is noted that assymetric lighting of the image may affect the appearance of symmetry in the image of FIG. 9). In certain embodiments, individual outlet flow through a swirler outlet such as 105 can be about 5.8 pounds per hour with about a 60° spray angle at 9 bar (e.g., continuous flow with DEF). In certain embodiments, droplet size may approach about 40 microns at about 15 bar, for example. The spray direction of the individual outlets can be oriented as desired to provide any suitable spray pattern and/or coverage. The number of swirler outlets can be adjusted to the desired flow range, providing consistent atomization characteristics for all flow ranges.

A solenoid valve can be utilized within a DEF injector to pulse the spray, in order to obtain the proper dosing rate required for the conditions. A controller can modify duty cycle and pulse width to provide spray during intermittent intervals. Unlike a diesel or gasoline fuel injector for example, which must deliver spray only at critical moments, the demand for DEF spray is more or less continual when the engine is running, but the volume must be adjusted. An alternate method to intermittent operation is to modulate the fluid supply pressure, thereby adjusting the flow rate. In general, spray quality decreases as supply pressure decreases, but it is believed that the performance of the injector described herein could provide satisfactory continuous spray for the entire range of flow rates required, due to the swirling nature of the spray. This could lead to a more effective reduction system since the flow of DEF would be evenly distributed rather than on/off bursts. However, a solenoid valve can be utilized by embodiments herein.

Certain embodiments include a circuitous cooling passage that directs coolant down one side of the injector stem, around the outlets, through a labyrinth on a back side of the injector head, and up the side of the injector which faces the exhaust flow, providing an efficient coolest-to-hottest cooling path, for example. Certain embodiments can use diesel fuel as cooling fluid, which can be diverted on the path from the fuel tank to the engine fuel injectors, for example, or can be recycled into the tank. Such an approach can provide a non-recycling flow to optimize cooling. Other coolants can include DEF, engine coolant, or any other fluid as long as the system is modified to ensure the fluid does not reach an unacceptable temperature for the respective fluid, which can be naturally accommodated by using diesel and a diesel reservoir. Also, an additional pumping system is not needed for a diesel coolant system. Embodiments can include a heat shield gap outboard of the cooling circuit to protect the innermost DEF circuit from heat and freezing temperatures, for example.

Embodiments include two piece swirling and metering outlets of any suitable number, e.g., four as shown. Each can include a plug ball that can be press fit and/or crimped in place to block flow and cause flow to go around an outer radius of the tapered portion and into the swirling holes. Offset holes can provide swirl, for example.

Certain embodiments can be integrally formed via additive manufacturing or any other suitable method. In certain embodiments, the base can be separately manufactured (e.g., via casting or machining) and attached to stem (e.g., which can be additively manufactured due to channel complexity). Stem features can be produced by additive manufacturing, allowing intricate passages in a very small envelope. Outlets can be conventionally machined, calibrated, and press fit, brazed or welded in place to the injector head. In certain embodiments, the stem can be about 0.22 inches wide and the head can be about 0.3 inches in diameter. The base can be shaped to attach to a DEF injector location on a diesel exhaust channel, however, any suitable shape is contemplated herein. Any other suitable assembly is contemplated herein.

Certain embodiments can include a solenoid added to the injection fluid inlet 103a to allow control of the flow. Embodiments can be pulsed, for example, using the solenoid. Certain embodiments can be operated in steady state and/or in pulsed mode, and can have a proportional valve to change flow rate. Using certain embodiments, the ability to hold tight flow tolerances and atomize well at lower pressures may eliminate the need to pulse the injector flow to achieve the proper dosing rate. Rather than on/off periods, flow variation can be achieved by modulating the fluid pressure, for example. Continuous flow should provide a more uniform mixture.

There is a need to reduce pollutants for on and off road diesel applications. Emission requirements for diesel engines are becoming increasingly stringent, and are difficult to meet with existing technology. About 2.7 million medium and heavy duty trucks are expected to be sold worldwide in 2020. Most of these vehicles will be equipped with a Selective Catalytic Reduction system (SCR) which reduces emissions by injecting Diesel Exhaust Fluid (DEF) into the exhaust stream. DEF is a reductant urea solution which, aided by a catalyst, causes Nitrogen Oxides (NOx) to convert to harmless diatomic nitrogen and water. DEF injectors face challenging performance conditions.

Many current state DEF injectors spray from one side of the exhaust pipe, sometimes at an angle, to provide better spray distribution. This keeps the injector somewhat protected from the high exhaust stream temperatures, which can reach 1100° F. (600° C.), for example. In this arrangement, spray can impinge on the exhaust pipe sidewall, causing inefficiencies and deposits to form. Traditional injectors spray DEF in the form of straight jets without swirl, which is not conducive to fine droplets. Embodiments disclosed herein can include features which allow swirling spray to be injected from the exhaust pipe centerline, and in multiple directions, if desired. Fine droplets can be placed strategically and more uniformly. Thermal protection features can also be included to protect the DEF and/or the structure from the high heat of the exhaust gas.

Embodiments may enable overall cost reductions in SCR treatment systems, for example, such as eliminating the need to pulse the spray, and utilizing the diesel fuel pump to provide injector cooling. Embodiments provide unmatched atomization and distribution.

Embodiments can provide small droplet size (e.g., less than about 40 micron) in order to evaporate for efficient conversion and to prevent deposits from forming on the walls and catalyst. Embodiments provide a well distributed spray which can allow for efficient conversion and prevent catalyst degradation. Embodiments enable high and low temperature tolerance to protect injection fluid (e.g., DEF begins to degrade at 150° F. (65° C.) and freezes at 12° F. (−11° C.)). Embodiments can operate without air which avoids the need for on-board compressed air that is not always available and adds cost to the system. Embodiments can provide accurate flow metering at transient demand which is can be accomplished by pulsing the spray at selected intervals or continuous flow.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fluid injector for injecting an injection fluid into a hot flow, comprising:
a flow structure defining an injection flow channel and configured to extend at least partially into a flow path to introduce the injection fluid into the hot flow in the flow path, wherein the flow structure includes a base, a stem extending from the base to an injector head at a distal end of the stem, wherein the flow structure includes one or more heat resistance features to protect the flow structure and the fluid from heat of the hot flow, wherein the stem is configured to extend the injector head into a center of the flow path, wherein the structure defines a cooling channel enclosed therein and configured to circulate a cooling fluid from an inlet on the base, through the stem, to the injector head, and back through the stem to an outlet on the base, wherein the cooling channel includes at least one tortuous path in the injector head to wind at least partially within the injector head in at least one direction.

2. The fluid injector of claim 1, wherein the fluid injector is configured to spray a selective catalytic reduction (SCR) fluid for at least partially causing a catalytic reaction within the hot flow.

3. The fluid injector of claim 2, wherein the flow path is a diesel exhaust channel, wherein the hot flow is diesel exhaust, wherein the SCR fluid is diesel exhaust fluid (DEF) such that the injector is a diesel exhaust fluid (DEF) injector configured to spray DEF into the diesel exhaust.

4. The fluid injector of claim 1, wherein the one or more heat resistance features includes active cooling.

5. The fluid injector of claim 1, wherein the one or more heat resistance features include an insulating structure.

6. The fluid injector of claim 5, wherein the insulating structure defines a heat shield gap within at least a portion of the stem and the injector head.

7. The fluid injector of claim 6, wherein the cooling fluid is diesel fuel.

8. The fluid injector of claim 3, wherein the one or more heat resistance features include a DEF recirculation path connected to the injection flow channel and configured to allow recirculation of the DEF to provide active cooling with recirculation of DEF.

9. The fluid injector of claim 3, further comprising one or more swirler outlets disposed in the injector head and in fluid communication with the injection flow channel to swirl and spray the injection fluid into the flow path.

10. The fluid injector of claim 9, wherein the one or more swirler outlets include a plurality of swirler outlets pointed in different directions.

11. The fluid injector of claim 1, wherein the injector head is circular.

12. A selective catalytic reaction (SCR) system, comprising:
a diesel exhaust fuel (DEF) injector configured to receive diesel fuel to cool the diesel exhaust fluid injector, wherein the DEF injector includes:
a flow structure defining an injection flow channel and configured to extend at least partially into a flow path to introduce the injection fluid into the hot flow in the flow path, wherein the flow structure includes a base, a stem extending from the base to an injector head at a distal end of the stem, wherein the flow structure includes one or more heat resistance features to protect the flow structure and the fluid from heat of the hot flow, wherein the structure defines a cooling channel enclosed therein and configured to circulate a cooling fluid from an inlet on the base, through the stem, to the injector head, and back through the stem to an outlet on the base, wherein the cooling channel includes at least one tortuous path in the injector head to wind at least partially within the injector head in at least one direction.

13. The SCR system of claim 12, wherein the injector head is circular.

14. A method, comprising:
injecting diesel exhaust fluid (DEF) into a diesel exhaust from a center of a diesel exhaust channel using the injector of claim 1.

15. The method of claim 14, further comprising actively cooling the DEF in the injector.

16. The method of claim 15, wherein actively cooling the DEF in the injector includes circulating diesel fuel through the injector.

17. The method of claim 15, wherein actively cooling the DEF includes circulating DEF through the injector.

* * * * *